(12) United States Patent
Lim (10) Patent No.: US 9,466,819 B2
(45) Date of Patent: Oct. 11, 2016

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventor: Young-Bin Lim, Yongin-Si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 0 days.

(21) Appl. No.: 13/759,002

(22) Filed: Feb. 4, 2013

(65) Prior Publication Data

US 2013/0236754 A1 Sep. 12, 2013

Related U.S. Application Data

(60) Provisional application No. 61/607,907, filed on Mar. 7, 2012.

(51) Int. Cl.
*H01M 2/12* (2006.01)
*H01M 2/10* (2006.01)

(52) U.S. Cl.
CPC ............ *H01M 2/12* (2013.01); *H01M 2/1077* (2013.01); *H01M 2/1211* (2013.01); *H01M 2/1217* (2013.01); *H01M 2/1223* (2013.01); *H01M 2/1252* (2013.01)

(58) Field of Classification Search
None
See application file for complete search history.

(56) References Cited

U.S. PATENT DOCUMENTS

| 516,583 | A | * | 3/1894 | Adkins ................. 312/334.8 |
| 2008/0145754 | A1 | * | 6/2008 | Partington et al. ........ 429/185 |
| 2011/0262799 | A1 | | 10/2011 | Kim |

FOREIGN PATENT DOCUMENTS

| CN | 102237501 A | | 11/2011 |
| EP | 2 381 507 A1 | | 10/2011 |
| JP | 7-59204 | | 3/1995 |
| JP | 2003-100274 A | | 4/2003 |
| JP | 2010205509 A | * | 9/2010 |
| JP | 2010-277736 A | | 12/2010 |
| KR | 2002-0001982 | | 1/2002 |

OTHER PUBLICATIONS

Och JP 2010205509A machine translation.*
Osumi at al. JP 2010-277736 A, machine translation.*
Extended European Search Report/Office action, for European Patent Application No. 13155810.8, dated Jun. 21, 2013, 6 pages.
SIPO Office action dated Mar. 8, 2016, for corresponding Chinese Patent application 201310071163.4, (8 pages).

* cited by examiner

*Primary Examiner* — Carlos Barcena
*Assistant Examiner* — Wojciech Haske
(74) *Attorney, Agent, or Firm* — Lewis Roca Rothgerber Christie LLP (57) ABSTRACT

A battery module including a plurality of battery cells each having a vent; an insulating member on the battery cells, the insulating member having a plurality of openings and a protrusion seal extending around a periphery of each of the openings; a pressurizing member on the insulating member, the pressurizing member having a plurality of openings; and a cover covering the insulating member and the pressurizing member.

11 Claims, 7 Drawing Sheets

BATTERY MODULE

CROSS-REFERENCE TO RELATED APPLICATION

This application claims priority to and the benefit of U.S. Provisional Application No. 61/607,907, filed on Mar. 7, 2012, the United States Patent and Trademark Office, the entire disclosure of which is incorporated herein by reference.

BACKGROUND

1. Field

The present invention relates to a battery module.

2. Description of the Related Art

Recently, a high output battery module has been developed by using a non-aqueous electrolyte of high energy density, the high output battery module including a plurality of battery cells connected in series to drive a motor such as an electric vehicle and the like in which high power is necessary.

A typical battery cell includes an electrode assembly composed of a positive plate, a negative plate and electrolyte, which generates energy by a electro-chemical reaction with the pole plates and the electrolyte. In this case, gas may be generated within the battery cell by side-reaction of the electro-chemical reaction.

SUMMARY

A battery module is provided that is capable of preventing a gas leak generated from the battery cell under degassing by forming a pressurizing member between a cover covering a vent and a gasket. In one embodiment, the battery module is capable of independently sealing each vent by forming a protrusion along a circumference of a first opening member facing the vent.

In one embodiment, a battery module is provided including a plurality of battery cells each having a vent; an insulating member on the battery cells, the insulating member having a plurality of openings and a protrusion seal extending around a periphery of each of the openings; a pressurizing member on the insulating member, the pressurizing member having a plurality of openings; and a cover covering the insulating member and the pressurizing member.

In one embodiment, the protrusion seal is a double protrusion seal. The double protrusion seal of the insulating member may include a first protrusion and a second protrusion configured to be movable with respect to the first protrusion. Further, the protrusion seal may extend around a periphery of the vent of at least one of the battery cells.

In one embodiment, the pressurizing member comprises a first pressurizing member and a second pressurizing member stepped from the first pressurizing member. Additionally, the cover may have a rib structure, configured to contact the pressurizing member, wherein the rib structure includes a pair of first ribs having a first length and a pair of second ribs having a second length different from the first length. In one embodiment, the pair of first ribs contacts the first pressurizing member and wherein the pair of second ribs contacts the second pressurizing member. Further, the pressurizing member further may include a fixing protrusion ext ending therefrom and the cover may have a fixing groove accommodating the fixing protrusion of the pressurizing member.

In one embodiment, the pressurizing member includes a pressurizing protrusion protruding towards the battery cells, wherein the pressurizing protrusion is generally aligned with the protrusion seal on the insulating member. In embodiments, the protrusion seal is made from a flexible material and the protrusion seal is integral as a single body with the insulating member.

In another embodiment, a battery module is provided including a plurality of battery cells each having a vent; a pressurizing member having a plurality of openings and a protrusion seal extending around a periphery of each of the openings; and a cover covering the insulating member and the pressurizing member.

DETAILED DESCRIPTION

In the following detailed description, only certain exemplary embodiments of the present invention have been shown and described, simply by way of illustration.

An embodiment of the present disclosure will be described with reference to accompanying drawings in detail.

Figure 1:
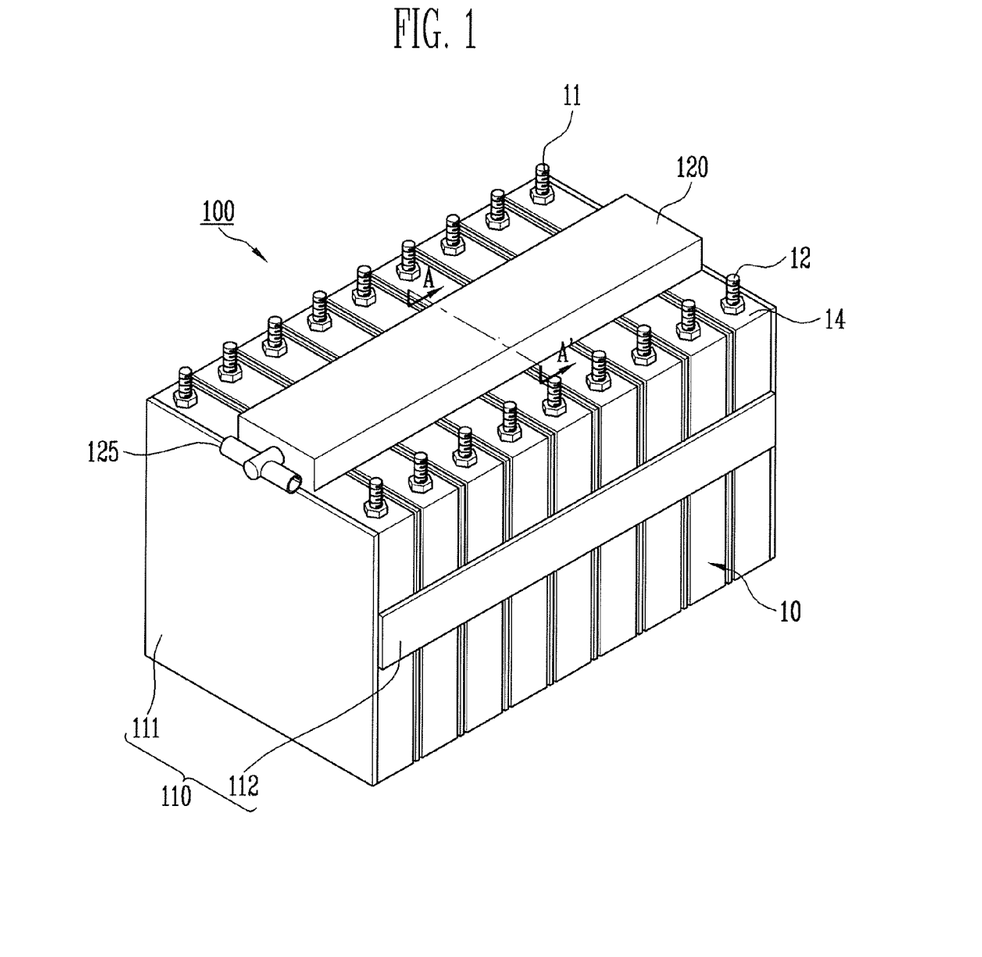
FIG. 1 is a perspective view showing a battery module according to a first embodiment of the present invention.
Figure 2:
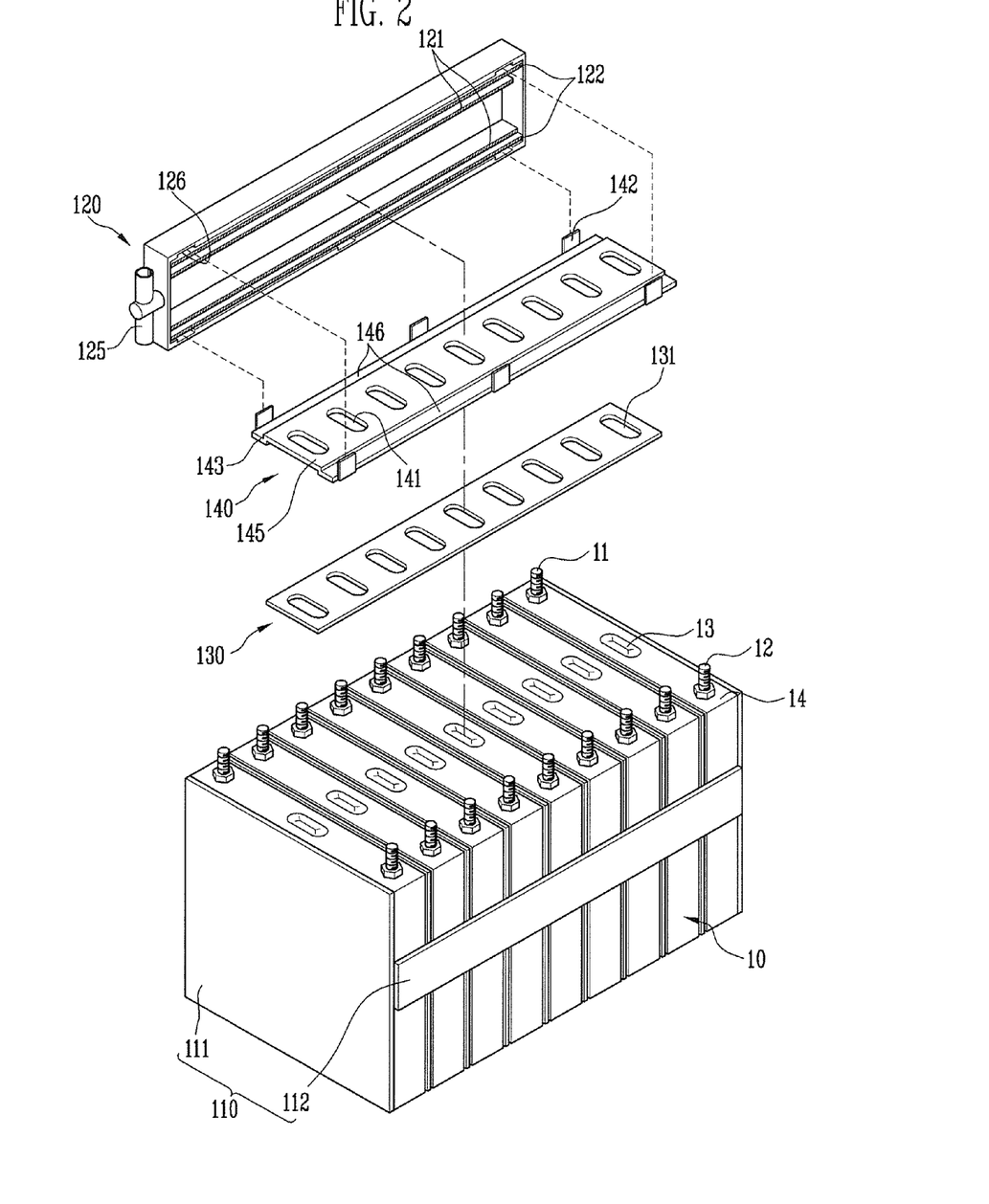
FIG. 2 is an exploded perspective view showing the battery module of FIG. 1.

FIG. 1 is a perspective view showing a battery module according to a first embodiment of the present invention and FIG. 2 is an exploded perspective view showing a battery module according to a first embodiment of the present invention.

Referring to FIGS. 1 and 2, a battery module according to the present invention includes a plurality of battery cells 10 forming a vent 13 for discharging gas, an insulating member 130 formed at a position generally corresponding to a vent 13 of the battery cell 10 and a cover 120 covering the vent 13 and the insulating member 130 at top thereof. In addition, a pressurizing member 140 includes between the cover 120 and the insulating member 130.

In this case, the cover 120 is a hexahedral shape, wherein one side thereof is opened, wherein the inside thereof has a space, and wherein the opened surface of the cover 120 faces the vents 13 on the top of the battery cell 10. Therefore, the space within the cover 120 may form a path capable of moving gas discharged from the vent 13 during degassing.

In addition, the insulating member 130 may be made of an elastic or flexible material such as silicon and includes a first opening 131 at a position generally corresponding to the vent 13. Such an insulating member 130 may be integrally formed to cover all of the vents 13 and a double protrusion may be formed along a circumference of the first opening 131 of a surface facing the vent 13 (see 132 in FIG. 3).

Such an insulating member 130 may be made of a heat-resistant material because the battery cell 10 generates heat in process of battery charging.

Sometimes the plurality of battery cells 10 can emit heat that melts the insulating member 130 attached to the battery cell 10. As described above, when the insulating member is melted, gas leaks due to a reduction of a sealing capacity between the insulating member 130 and the cover 120. Therefore, the insulating member 130 can be made of a heat-resistant material to prevent a gas leak.

In addition, the pressurizing member 140 placed on the top of the insulating member 130 includes a second opening 141 at an area generally corresponding to the first opening 131. Such a pressurizing member 140 includes a first pressurizing member 145 along a center portion of a longitudinal direction thereof, a second pressurizing member 146 formed to step from the first pressurizing member 145 along both ends of the first pressurizing member 145 and a connector 143 connecting the first pressurizing member 145 and second pressurizing member 146.

In one embodiment, the first pressurizing member 145 is placed above the insulating member 130 and the top of the battery cell 10 and the second pressurizing member 146 is placed above the top of the battery cell in which the insulating member is not formed. Therefore, a space surrounded by the first pressurizing member 145, the connecting element 143, and the vent 13 is formed by the step between the first pressurizing member 145 and the second pressurizing member 146, and wherein the insulating member 130 may be located in the space.

In addition, both ends of the second pressurizing member have at least one fixing protrusion 142 bent vertically toward the cover 120. Further, the fixing groove 126 is formed in the cover 120 generally corresponding to the fixing protrusion 142. The pressurizing member 146 is firmly fixed and the insulating member 130 placed below the pressurizing member 146 can be further pressurized by inserting the fixing protrusion 142 into the fixing groove 126. This improves a sealing of the gas flowing path formed within the cover 120.

In addition, the cover 120 is seated on the top of the battery cell 10 so that an opened surface thereof is in communication with the vent 13, and at least one rib 121 and 122 is formed in the inner space of the cover 120 along a longitudinal direction. Such a rib 121 and 122 includes a pair of first ribs 121 formed at position generally corresponding to the first pressurizing member 145 of the pressurizing member 140 and a pair of second ribs 122 formed at a position generally corresponding to the second pressurizing member 146 of the pressurizing member 140. In this case, since the first pressurizing member 145 and second pressurizing member 146 are stepped, a length of the first rib 121 is shorter than a length of the second rib 122.

One end of the cover is formed with a gas discharging port 125 connected with the outside. On degassing in a battery cell 10, gas discharged through the vent 13 moves through the cover 120 and is discharged out of the gas discharging port 125. In this case, the gas discharging port 125 is formed in a T-shape. Since a left side and a right side is opened, the gas does not have an effect on an adjacent battery module 100. However, a type of the gas discharge port is not limited to the ones described herein.

Next, a battery cell and a housing will briefly described.

The battery cell 10 includes an electrode case and a cap plate 14 sealing an open area. The electrode case houses an electrode assembly having positive plate and a negative plate, and a separator located between these pole plates, and an electrolyte. A positive terminal 11 connected with the positive plate and a negative terminal 12 connected with the negative plate, which are formed at both ends of the cap plate 14, protrude from the electrode assembly. The positive plate and the negative plate of the electrode assembly react with the electrolyte to generate energy. The energy is transferred through the positive terminal 11 and the negative terminal 12 into the outside.

In addition, if a gas pressure generated from the inside of the battery cell 10 is above a predetermined value, the vent 13 provided between the positive terminal 11 and the negative terminal 12 of the cap plate 14 serves as a discharge path of gas from the battery cell 10. Therefore, the vent 13 can prevent the battery cell 10 from being damaged by the internal pressure thereof. The gas can be generated as a byproduct of the pole plate and electrolyte as the battery cell 10 is charged and such a gas is discharged through the vent 13.

An external case of the battery cell 10 is made of metal and the cover 120 is made of plastic resin. In this case, since the battery cell 10 and the cover 120 are made of heterogeneous or different materials, when the cell 10 and the cover 120 contact each other, they may not form a secure connection and a gas leak may occur in a vulnerable area. In order to prevent or minimize this, the insulating member 130 is provided between a battery pack 10 and the cover 120 to keep an area between the battery cell 10 and the cover 120 airtight.

In addition, the housing 110 includes a pair of end plates 111 provided in both ends of a plurality of battery cells 10, a side bracket 112 connecting the side of the end plates 111 and a bottom bracket connecting the bottom of the end plates 111.

Here, the pair of end plates 111 are formed to surface-contact the uppermost battery 10 to compress the plurality of battery cells 10.

In addition, the side bracket 112 is connected to each of the end plates 111 to support both sides of the plurality of battery cells. Further, the bottom of the battery cell 10 is supported by the bottom bracket. As described above, the plurality of battery cells 10 are housed by a housing 110 composed of the pair end plates 111, the side bracket 112, and the bottom bracket.

Figure 3:
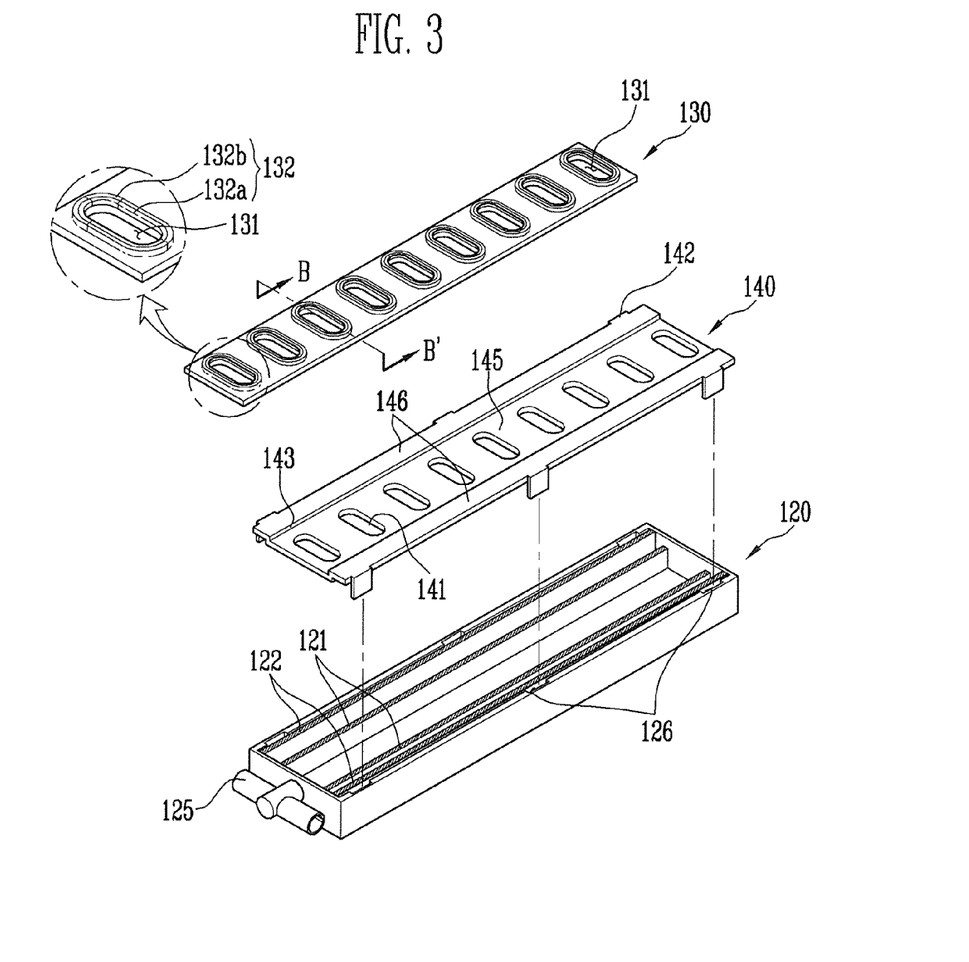
FIG. 3 is a rear perspective view of a cover, a pressurizing member and a gasket of the battery module of FIG. 1.

FIG. 3 is a rear perspective view of a cover, a pressurizing member and a gasket according to a first embodiment of the present invention.

Referring to FIG. 3, an insulating member 130 is formed to generally correspond to a vent (see 13 in FIG. 2) of the top of a battery cell (see 10 in FIG. 2) according to the first embodiment of the present invention.

A pressurizing member 140 is formed below the insulating member 130 and a cover 120 is formed below the insulating member 130 and the pressurizing member 140. The cover 120 is formed in a hexahedral shape providing a space between the cover and the battery cells, which one side thereof is opened. The opened surface of such a cover 120 is placed over the vent 13.

In one embodiment, the insulating member 130 includes a first opening 131 at an area generally corresponding to the vent 13 and a double protrusion 132 formed along a circumference of the first opening 131 of the insulating member 140 facing the vent 13. The double protrusion 132 includes a first protrusion 132a formed along the circumference of the first opening 131 and a second protrusion 132b formed along the circumference of the first protrusion 132a. The first protrusion 132a and the second protrusion 132b closely contact each other in a non-pressurized state and a gap therebetween widens due to pressurization. The first protrusion 132a and the second protrusion 132b are integral with the insulating member 130 and may be made of a material of the same silicon as the insulating member 130. Although a double protrusion has been described herein, a single protrusion may also be used within the spirit and scope of the present invention.

In addition, the pressurizing member 140 includes a second opening 141 at an area generally corresponding to the first opening 131.

Such a pressurizing member 140 includes a first pressurizing member 145 extending along a center portion of a longitudinal direction and a second pressurizing member 146 stepped with the first pressurizing member 145 extending along both ends of the pressurizing member 145. The first pressurizing member 145 and the second pressurizing member 146 are connected by a connector 143. In one embodiment, a space surrounded by the first pressurizing member 145 and the connecting element 143 is formed by stepping the first pressurizing member 145 and the second pressurizing member 146. The insulating member 130 can be accommodated in the space.

In addition, the cover 120 accommodated the insulating member 130 and the pressurizing member 140 and the space within the cover 120 can be used as a flow path though which gas is discharged from the vent 13 move during a degassing.

In addition, a least one rib 121 and 122 is formed within the space of the cover 120 along the longitudinal direction of the cover 120. The ribs 121 and 122 include a pair of first ribs formed at position generally corresponding to the first pressurizing member 145 of the pressurizing member 140 and a pair of a ribs 122 formed at a position generally corresponding to the second pressurizing member 146 of the pressurizing member 140.

In one embodiment, since the first pressurizing member 145 and the second pressurizing member 146 of the pressurizing member 140 are stepped, a length of the first rib 121 pressurizing the first pressurizing member 145 is shorter than a length of the second rib 122 pressurizing the second pressurizing member 146. In one embodiment, a pair of first ribs at position generally corresponding to the first pressurizing member 145 is formed to generally correspond to a double protrusion 132 of the insulating member 130.

Furthermore, both ends of the second pressurizing member 146 of the pressurizing member 140 have at least one fixing protrusion 142 vertically bent toward the cover 120 and the cover 120 corresponding to the fixing protrusion 142 is formed with a fixing groove 126. This enables the fixing protrusion 142 of the pressurizing member 140 to be inserted into the fixing groove 126 of the cover 120.

Figure 4:
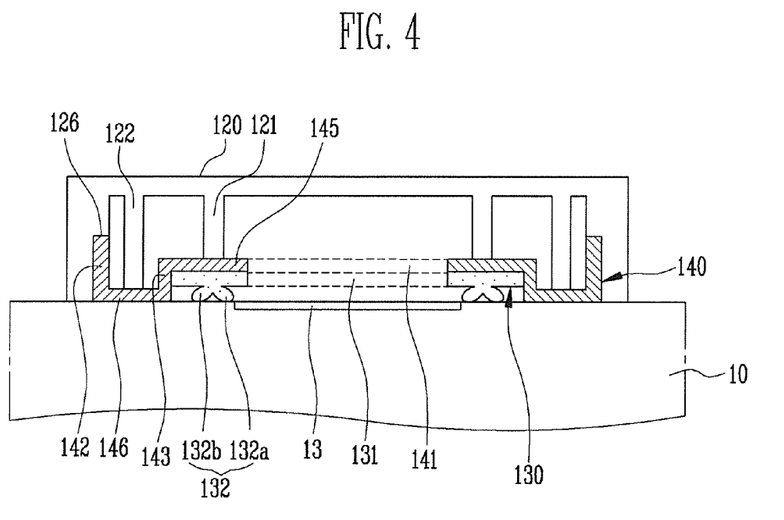
FIG. 4 is a cross-sectional view taken along line A-A' of FIG. 1.

FIG. 4 is a cross-sectional view taken along line A-A' of FIG. 1 and FIG. 3 is a cross-sectional view taken along line B-B' of FIG. 3.

Figure 5:
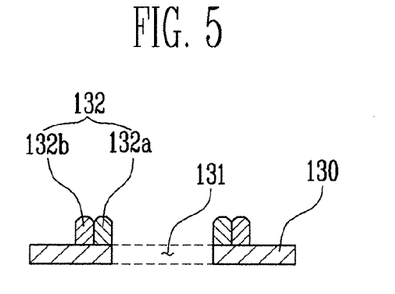
FIG. 5 is a cross-sectional view taken along line B-B' of FIG. 3.

Referring to 4 and 5, the insulating member 130 is formed at a position generally corresponding to a vent 13 of a battery cell 10.

As shown in the figures, one surface of the insulating member 130 in contact with the batter cell 10 is formed with a double protrusion 132 along a circumference of the first opening 131. In addition, the pressurizing member 140 is formed on top of the insulating member 130. The pressurizing member 140 includes a first pressurizing member 145 close to the top of a insulating member 130, a second pressurizing member 146 placed in both end portions of the first pressurizing member 145 and formed to step with the first pressurizing member 145 to be closed to the top of the battery cell 10 and a connector 143 connecting the first pressurizing member 145 and a second pressurizing member 146.

In addition, the insulating member 130 and the pressurizing member 140 is covered by a cover 120 having an interior space. In this case, both ends of the second pressurizing member 146 of the pressurizing member 140 formed with at least one fixing protrusion 142 vertically bent toward the cover 120. The fixing protrusion 142 is inserted into the fixing groove 126 on the cover 120 and the pressurizing member 140 pressurizes the insulating member 130 by pressurizing the pressurizing member 140 of the cover 120. Therefore, the double protrusion of the insulating member 130 becomes wider to more easily seal the vent.

Additionally, the top of the inside of the cover 120 facing the pressurizing member 140 is formed with at least one rib 121 and 122 along a longitudinal direction of the cover 120. Herein, a pair of first ribs 121 located to generally correspond to the first pressurizing member 145 can pressurize the pressurizing member 140 and the insulating member 130, and the battery cell 10. Herein, a pair of second ribs located to generally correspond to the second pressurizing member 146 can pressurize the pressurizing member 140 and the battery cell 10. In this case, the first rib 121 is formed to generally correspond to the double protrusion 132 of the insulating member 130 to apply a greater pressure to the double protrusion 132.

The pressure is applied to the pressurizing member 140 by the first rib 121 and the second rib 122 formed on an inner side of the cover and such a pressure is applied to the insulating member 130 through the pressurizing member 140. Therefore, a portion of the insulating member 130 not corresponding to the first rib 121 and the second rib 122 also can be pressurized against the top of the battery cell 10.

The first protrusion 132a and the second protrusion 132b are close to each other when the pressure is not applied, whereas they separate in generally opposite directions when the pressure is applied to the first protrusion 132a and the second protrusion 132b. This enables the top of the battery cell 10 and the insulating member 130 to be closed. Therefore, gas discharged from the vent under a degassing may be discharged through the first opening 131. In addition, a gap does not occur between the insulating member 130 and the pressurizing member 140 because the pressurizing member 140 is pressurized by the cover 120. Therefore, gas discharged through the first opening 131 can be discharged through the second opening 141 into the inner space of the cover 120, that is, through the gas flow path into the outside.

Figure 6:
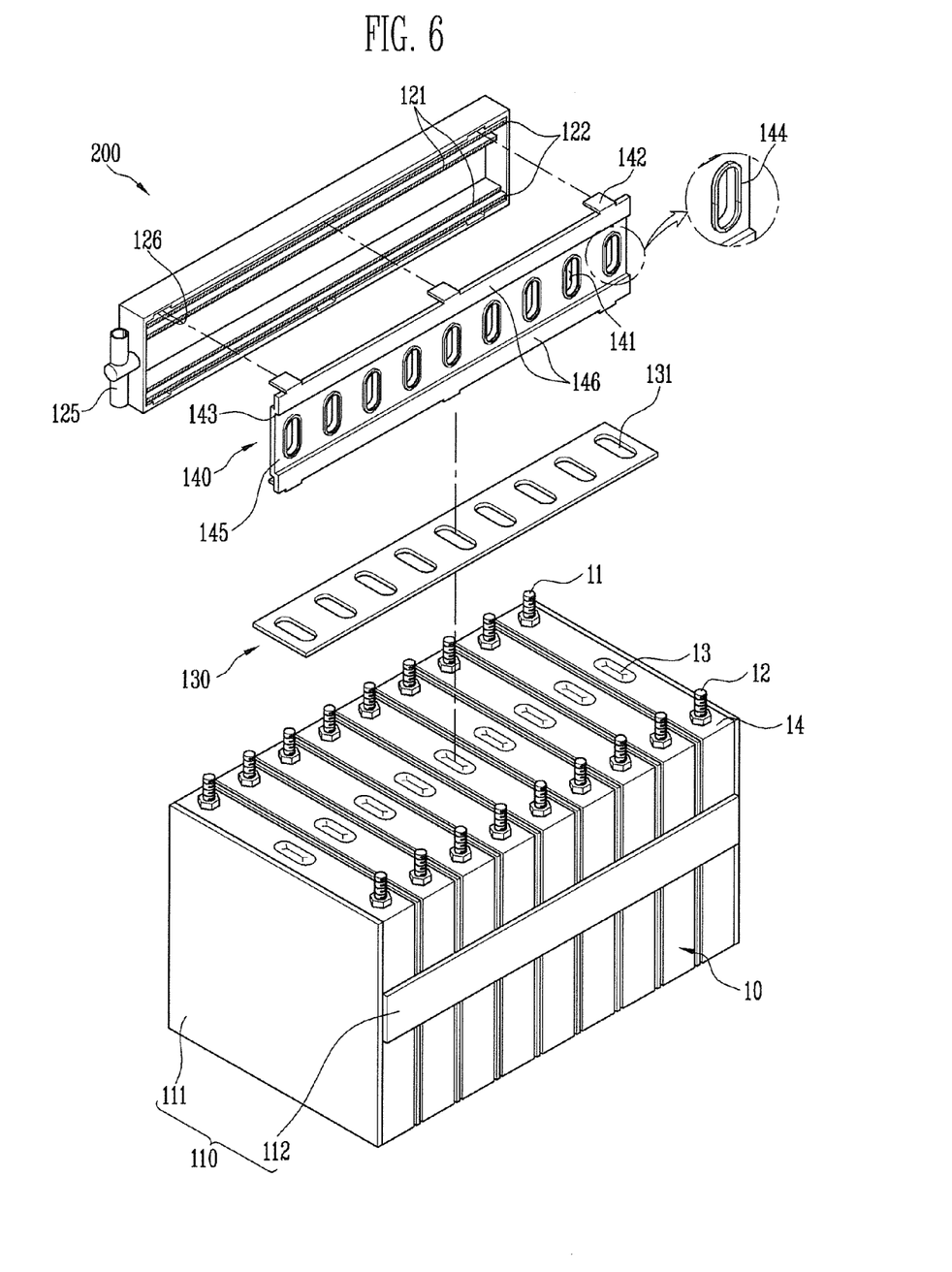
FIG. 6 is an exploded perspective view showing a battery module according to a second embodiment of the present invention.
Figure 7:
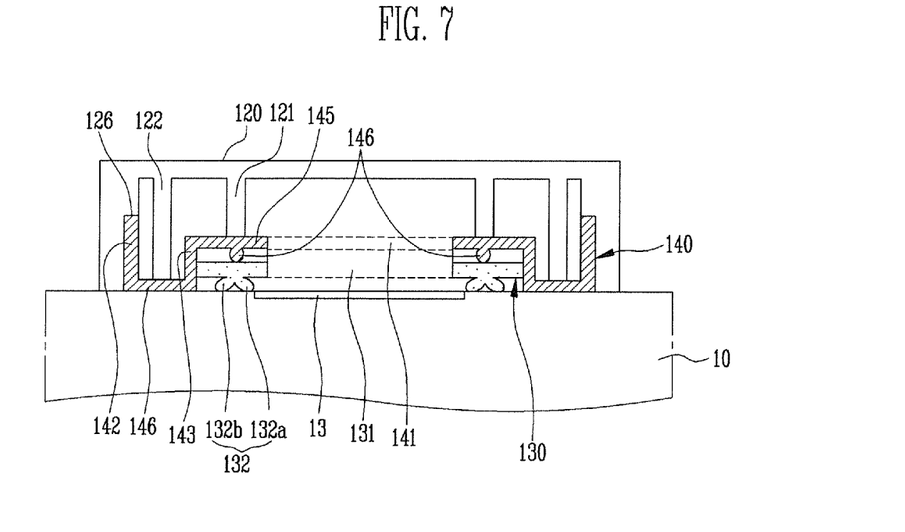
FIG. 7 is a vertical perspective view showing a top of the battery module of FIG. 6.

FIG. 6 is exploded perspective view of a battery module according to a second embodiment of the present invention and FIG. 7 is a vertical cross-sectional view of the top of the battery module according to a second embodiment of the present invention.

The battery module according to the second embodiment of the present invention is substantially similar to that of the first embodiment expect for the pressurizing protrusion formed in the pressurized element. Therefore, a duplicate detailed description will be omitted.

Referring to FIGS. 6 and 7, the battery module 200 according to a second embodiment of the present invention is arranged in one direction and includes a plurality of battery cells 10 having a vent 13 which discharges gas to the top thereof, an insulating member 130 formed at position generally corresponding to the vent 13 of a battery cell 10 and a cover 120 covering the vent 13 and the insulating member 130. A pressurizing member 140 is further between the cover 120 and the insulating member 130.

Herein, the insulating member 130 is formed with a double protrusion 132 along a circumference of the first opening 131 facing the vent 13.

In addition, one surface of the pressurizing member 140 facing the insulating member 130 is formed with the pressurizing protrusion 144 along a circumference of the second opening 141. In one embodiment, the pressurizing protrusion 144 is formed at a position generally corresponding to an area in which the double protrusion 132 is formed.

The pressure which the cover 10 applies to the battery cell 10 is transferred to the insulating member 130 through the pressurizing member 140, but the area in which the pressurizing protrusion 144 is formed is subjected to a greater pressure. That is, the area having the double protrusion 132 is exposed to an intense pressure compared with other areas by the pressurizing protrusion 144 formed to correspond to the double protrusion 132 of the insulating member 130. This enables the sealing capacity between the battery cell 10 and the insulating member 130 to prevent or reduce the likelihood of gas leaks between the battery cell 10 and the insulating member 130.

Embodiments of the present invention prevent a gas leak generated from the battery cell to the outside by forming the pressurizing member between a cover covering a vent and the gasket which improves sealing of the gas discharge path.

In addition, each vent is independently sealed by a double protrusion along a circumference of a first opening of a gasket facing the vent to prevent a gas from leaking to the outside.

As those skilled in the art would realize, the described embodiments may be modified in various different ways, all without departing from the spirit or scope of the present invention.

What is claimed is:

1. A battery module comprising:
a plurality of battery cells each having a vent;
an insulating member directly contacting the battery cells, the insulating member having a plurality of openings, each of the openings corresponding to a respective vent, and a double protrusion seal extending around a periphery of each of the openings and towards the battery cells, wherein the double protrusion seal of the insulating member comprises a first protrusion and a second protrusion configured to be movable with respect to the first protrusion, wherein both the first and second protrusions extend toward the battery cells;
a pressurizing member directly contacting the insulating member, the pressurizing member having a plurality of openings and a fixing protrusion extending away from the battery cells; and
a cover entirely covering the insulating member and the pressurizing member, the cover having a rib structure on and contacting the pressurizing member and a fixing groove accommodating the fixing protrusion.

2. The battery module of claim 1, wherein the double protrusion seal extends around a periphery of the vent of at least one of the battery cells.

3. The battery module of claim 1, wherein the pressurizing member comprises a first pressurizing member and a second pressurizing member stepped from the first pressurizing member.

4. The battery module of claim 1, wherein the rib structure comprises a pair of first ribs having a first length and a pair of second ribs having a second length different from the first length.

5. The battery module of claim 4, wherein the pair of first ribs contacts the first pressurizing member and wherein the pair of second ribs contacts the second pressurizing member.

6. The battery module of claim 1, wherein each of the openings on the pressurizing member is generally aligned to a corresponding one of the openings on the insulation member.

7. The battery module of claim 1, wherein the pressurizing member comprises a pressurizing protrusion protruding towards the battery cells.

8. The battery module of claim 7, wherein the pressurizing protrusion is generally aligned with the protrusion seal on the insulating member.

9. The battery module of claim 1, wherein the cover defines a discharge channel through which gas exiting the vent can flow.

10. The battery module of claim 1, wherein the double protrusion seal comprises a flexible material.

11. The battery module of claim 1, wherein the protrusion seal is integral as a single body with the insulating member.

* * * * *